United States Patent
Gissel et al.

(10) Patent No.: US 7,571,230 B2
(45) Date of Patent: *Aug. 4, 2009

(54) METHOD AND SYSTEM FOR MONITORING SERVER EVENTS IN A NODE CONFIGURATION BY USING DIRECT COMMUNICATION BETWEEN SERVERS

(75) Inventors: Thomas R. Gissel, Apex, NC (US);
Brian Keith Martin, Cary, NC (US);
Jason Robert McGee, Apex, NC (US);
William Thomas Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/233,867

(22) Filed: Sep. 19, 2008

(65) Prior Publication Data

US 2009/0031024 A1    Jan. 29, 2009

Related U.S. Application Data (63) Continuation of application No. 10/977,700, filed on Oct. 29, 2004.

(51) Int. Cl.
*G06F 15/173* (2006.01)
(52) U.S. Cl. .................. 709/224; 709/223; 709/205
(58) Field of Classification Search ............. 709/206, 709/223, 224, 205
See application file for complete search history.

(56) References Cited

U.S. PATENT DOCUMENTS 6,230,160 B1   5/2001   Chan et al.
6,505,248 B1   1/2003   Casper et al.
6,631,409 B1   10/2003  Watson et al.
6,697,963 B1   2/2004   Nouri et al.

(Continued)

FOREIGN PATENT DOCUMENTS

JP    2000250844 A    9/2000

(Continued)

OTHER PUBLICATIONS

JMX Event Notification:, Aug. 18, 2004, pp. 1-4. http://www.j2eeolympus.com/J@EE/JMX/JMXEventNotification.jsp.

(Continued)

*Primary Examiner*—Ario Etienne
*Assistant Examiner*—El Hadji M Sall
(74) *Attorney, Agent, or Firm*—Yee & Associates, P.C.; Jeanine S. Ray-Yarletts (57) ABSTRACT

In a method and system for monitoring events occurring at respective servers of a configuration of nodes, a first server located at a first node receives information from a messaging system pertaining to events at servers located at other nodes. The messaging system usefully comprises a highly available (HA) bulletin board or the like. When the first server receives a start event notification pertaining to a second server located at a second node, a direct communication path is established between the first and second servers. The first server identifies events in the second server that affect or are of interest to services of the first server. The first server then registers with the second server, to receive notification through the direct communication path when respective identified events occur.

2 Claims, 6 Drawing Sheets

U.S. PATENT DOCUMENTS

| | | | |
|---|---|---|---|
| 6,701,463 | B1 | 3/2004 | Toeller |
| 6,738,811 | B1 | 5/2004 | Liang |
| 6,952,733 | B1 * | 10/2005 | Felsman et al. ............. 709/227 |
| 2002/0029256 | A1 | 3/2002 | Zintel et al. |
| 2003/0149799 | A1 | 8/2003 | Shattuck et al. |
| 2004/0019669 | A1 * | 1/2004 | Viswanath et al. .......... 709/223 |
| 2004/0111729 | A1 | 6/2004 | Moore et al. |
| 2005/0038772 | A1 * | 2/2005 | Colrain ........................... 707/1 |
| 2005/0213511 | A1 * | 9/2005 | Reece et al. ................. 370/252 |
| 2006/0069771 | A1 | 3/2006 | Gissel et al. |

FOREIGN PATENT DOCUMENTS

| | | | |
|---|---|---|---|
| JP | 2003228529 A | 8/2003 | |
| WO | 0193503 A2 | 12/2001 | |

OTHER PUBLICATIONS

Davidson et al., "Instrument Your Application Using JMX", Aug. 18, 2004, pp. 1-5. http://www.devresource.hp.com/drc/tutorials/JMX/mBean__123_tutorial.jsp.

Rogers, "Managing Java Applications Using JMX", Aug. 18, 2004, pp. 1-15. http://devresource.hp.com/drc/slide_presentations/mgJavaAppJMX/index.jsp.

Max et al., "Humanities and Arts: Sharing Center Stage on the Internet", IETF Standard-Working-Draft, Internet Engineering Task Force, IETF, CH, vol. harts, No. 3, Jul. 1997, pp. 1-45.

* cited by examiner

METHOD AND SYSTEM FOR MONITORING SERVER EVENTS IN A NODE CONFIGURATION BY USING DIRECT COMMUNICATION BETWEEN SERVERS

RELATED APPLICATION

This application is related to commonly assigned and co-pending U.S. patent application Ser. No. 10/953,324 entitled "Method, System and Program Product for Decentralized Monitoring of Server States Within a Cell of Nodes", hereby incorporated by reference.

This application is a continuation of application Ser. No. 10/977,700, filed Oct. 29, 2004, status, allowed.

BACKGROUND OF THE INVENTION

1. Technical Field

The invention disclosed and claimed herein generally relates to a method and system for providing each node in a node cell, or configuration of nodes, with server state information pertaining to the servers in other nodes. More particularly, the invention pertains to a method of the above type wherein server event information is exchanged directly between servers of different nodes, by establishing a direct communication path between the two servers. Even more particularly, the invention pertains to a method of the above type wherein services in a first server are able to specify particular events in a second server, wherein the first server is to be notified whenever the specified events in the second server occur.

2. Description of Related Art

In an increasingly common arrangement comprising a node cell, or configuration of nodes, each node includes a node agent and one or more application servers. In configurations of this type it is generally necessary for respective nodes to be kept informed of the server states of other nodes. Application server states of interest respectively can include indications of whether a server (1) is starting, (2) has started, (3) is stopping, or (4) has stopped. If the nodes are not provided with server state information of this type on a current basis for other nodes, respective nodes will not be able to synchronize with one another. Accordingly, present node configurations are typically provided with a central node manager to which the individual nodes report their own server state information. Then, if a particular node desires state information pertaining to another node, the particular node will obtain such information directly from the node manager. Moreover, it may be desirable in a node configuration to apprise or inform a given node of certain state events, such as Java Management Extension (JMX) events, when they occur in a server of another node.

Figure 1:
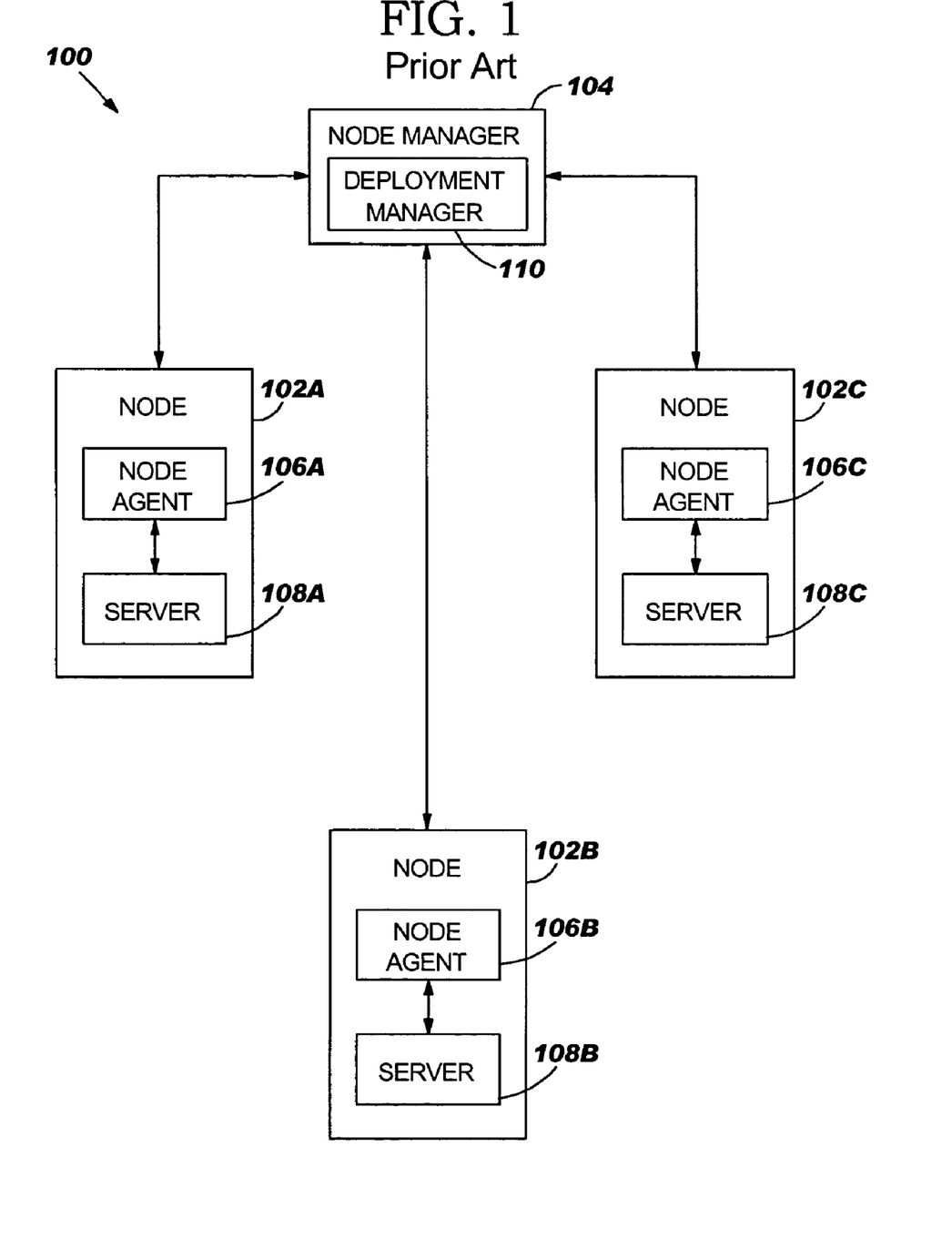
FIG. 1 is a block diagram showing a system for centralized monitoring of server states in a configuration of nodes in accordance with the related art.

An illustration of a current node cell or node configuration is shown in FIG. 1. As depicted, FIG. 1 shows node configuration 100 having nodes 102 A-C and a node manager 104. Node manager 104 includes deployment manager 110, which oversees and manages node configuration 100. Each node 102 A-C is shown including node agents 106 A-C and application servers 108 A-C, respectively. Node agents 106 A-C generally serve as an intermediary between application servers 108 A-C, respectively, and deployment manager 110. Moreover, administrative logic running in node agents 106 A-C respectively keeps the configuration data of nodes 102 A-C synchronized with the configuration data of other nodes 102 A-C in node configuration 100. In general, node agents 106 A-C report state information, for the application servers 108 A-C that they respectively control, directly to deployment manager 110. For example, as the application servers 108 A-C on nodes 102 A-C change states, information indicating the changes will be communicated by node agents 106 A-C to deployment manager 100. Thereafter, if node agents 106 A-C respectively desire to obtain this state information, they will do so by directly communicating with deployment manager 100/node manager 104.

Notwithstanding its advantages, a node configuration of the type shown in FIG. 1 has a single point of failure. More particularly, if either node manager 104 or deployment manager 110 fails, there is no way for nodes 102 A-C to obtain needed server state information. As stated above, nodes 102 A-C will not be able to synchronize with one another, if the server state information is not available to them. Currently, efforts have been made to overcome this problem by linking the node agents of two different nodes together. However, with this solution, the node agent of each node would still remain as a potential single point of failure.

BRIEF SUMMARY OF THE INVENTION

The invention disclosed herein generally provides embodiments wherein two servers, located at different nodes in a node configuration, can be joined together by establishing a communication path directly between the two servers. The established path deliberately excludes components such as node manager 104, deployment manager 110, and node agents 106 A-C shown in FIG. 1. Thus, none of such components can act as a single point of failure blocking transmission of state information from one server to another. Embodiments of the invention use a messaging system, such as a highly available (HA) bulletin board or the like, that is disposed to receive state information from each server of the node configuration. In one useful embodiment, directed to a method for monitoring events occurring at respective servers of the node configuration, a first server located at a first node receives information from a messaging system pertaining to events at servers located at other nodes. The method further comprises establishing a direct communication path between the first server and a second server located at a second node, when the first server receives a start event notification pertaining to the second server from the messaging system. Messages can then be sent directly from the second server to the first server through the communication path, to notify the first server when specified events of interest to the first server occur at the second server.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 2:
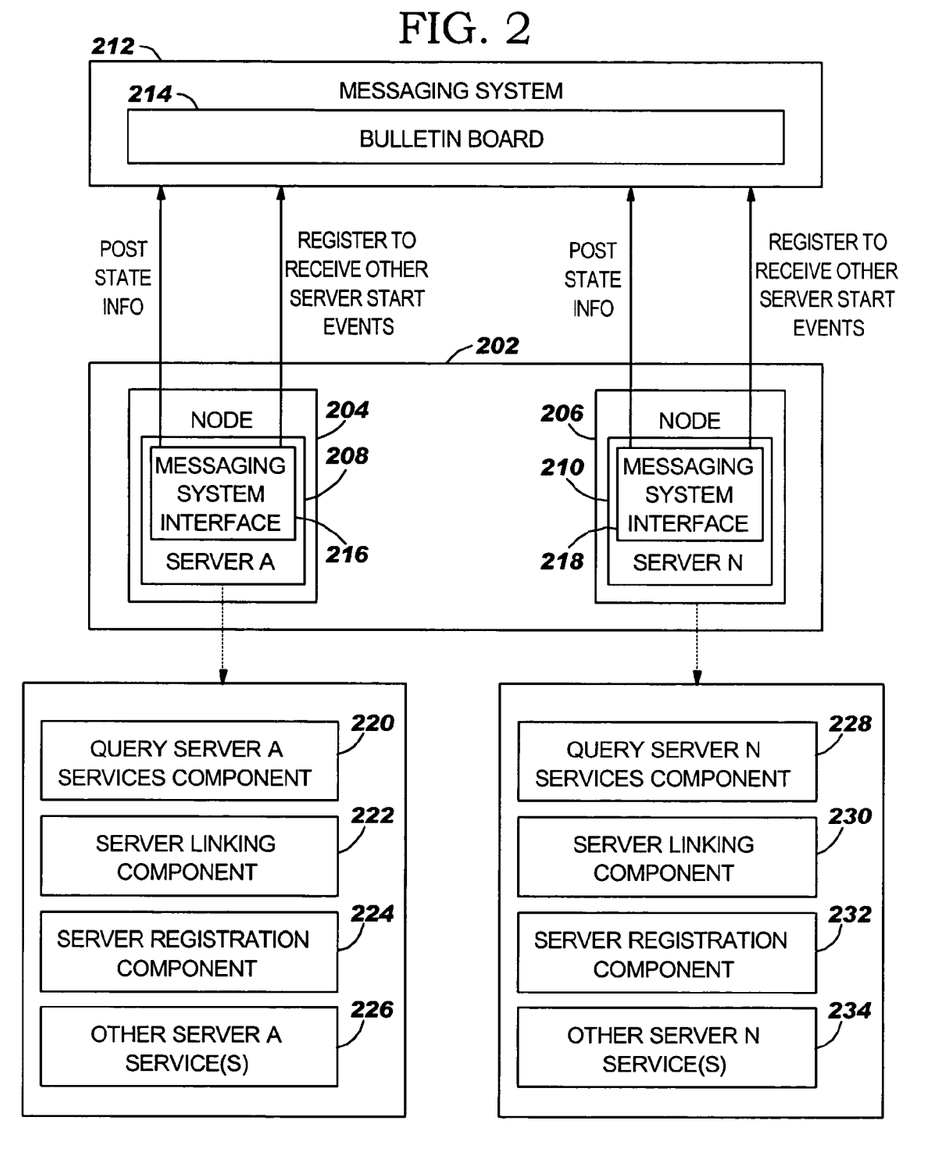
FIG. 2 is a block diagram showing a node configuration having components adapted to operate in accordance with an embodiment of the invention.

Referring to FIG. 2, there is shown a configuration of nodes 202 that includes nodes 204 and 206. It is to be understood that while node configuration 202 is shown to have two nodes, this is done only for illustrative purposes and to simplify explanation. Node configuration 202 could in fact comprise different numbers of nodes, depending on use and application thereof. In addition, it should be appreciated that nodes 204 and 206 are intended to represent any type of computerized device capable of carrying out the teachings of the present invention. For example, nodes 204 and 206 could be desktop computers, laptop computers, hand held devices, clients, servers or the like. Moreover, nodes 204 and 206 could selectively be connected over a network such as the Internet, a local area network (LAN), a wide area network (WAN) or a virtual private network (VPN), for example. Also, communication throughout the node configuration 202 could occur via a direct hard wired connection, or an addressable connection utilizing any combination of wired and/or wireless methods. Conventional network connectivity such as Token Ring, Ethernet or other conventional communication standards could be used. Connectivity could also be provided by conventional IP-based protocol, wherein an Internet service provider is used to established interconnectivity.

Referring further to FIG. 2, there is shown node 204 provided with an application server 208, further referenced as server A, and node 206 provided with an application server 210, further referenced as server N. Nodes 204 and 206 may in fact each include more servers than servers A and N. However, such additional servers have not been shown herein, in order to simplify explanation and illustration. Node agents for nodes 204 and 206, used in the operation of respective servers thereof, have also not been shown.

FIG. 2 further shows a messaging system 212, usefully comprising an HA messaging system having a bulletin board 214. Bulletin board 214 usefully comprises a product of the International Business Machines Corporation that is known in the industry as WebSphere, but bulletin board 214 is not limited thereto. Messaging system 212 is adapted to communicate information directly with server 208 of node 204, and also with server 210 of node 206. More particularly, server 208 is provided with a messaging system interface service 216, or like component, for posting the state of server 208 onto bulletin board 214. Interface service 216 is also configured to register server 208 in messaging system 212, in order to receive start event notifications for specified other servers of node configuration 202, including server 210 of node 206. Generally, interface 216 registers to receive start events for other servers that post to messaging system 212, wherein the servers pertain to messaging topics or subjects that are related to services of server 208.

In like manner, server 210 is provided with a messaging system interface 218 for posting the state of server 210 onto bulletin board 214. Interface 218 is also operable to register server 210 to receive start event notifications for the servers of other nodes of node configuration 202, such as server 208.

In some useful embodiments of the invention, the state of a server is posted to bulletin board 214 by its interface service whenever the server is starting. Other information posted to bulletin board 214 could pertain to JMX state events of application servers such as 208 and 210. Such state events include, among others, a server that is starting, a server that has started, a server that is stopping and a server that has stopped. It should be understood that bulletin board 214 is depicted to be within messaging service 212 for illustrative purposes only. It is anticipated that other arrangements thereof will occur to those of skill in the art.

When a messaging system interface component 216 or 218 initially registers to receive start events of other specified servers, it retrieves the identities of all such servers that are then currently running. Thereafter, whenever one of the specified servers is started, the messaging system 212 and bulletin board 214 notify the messaging system interface component 216 or 218 of such event.

Figure 3:
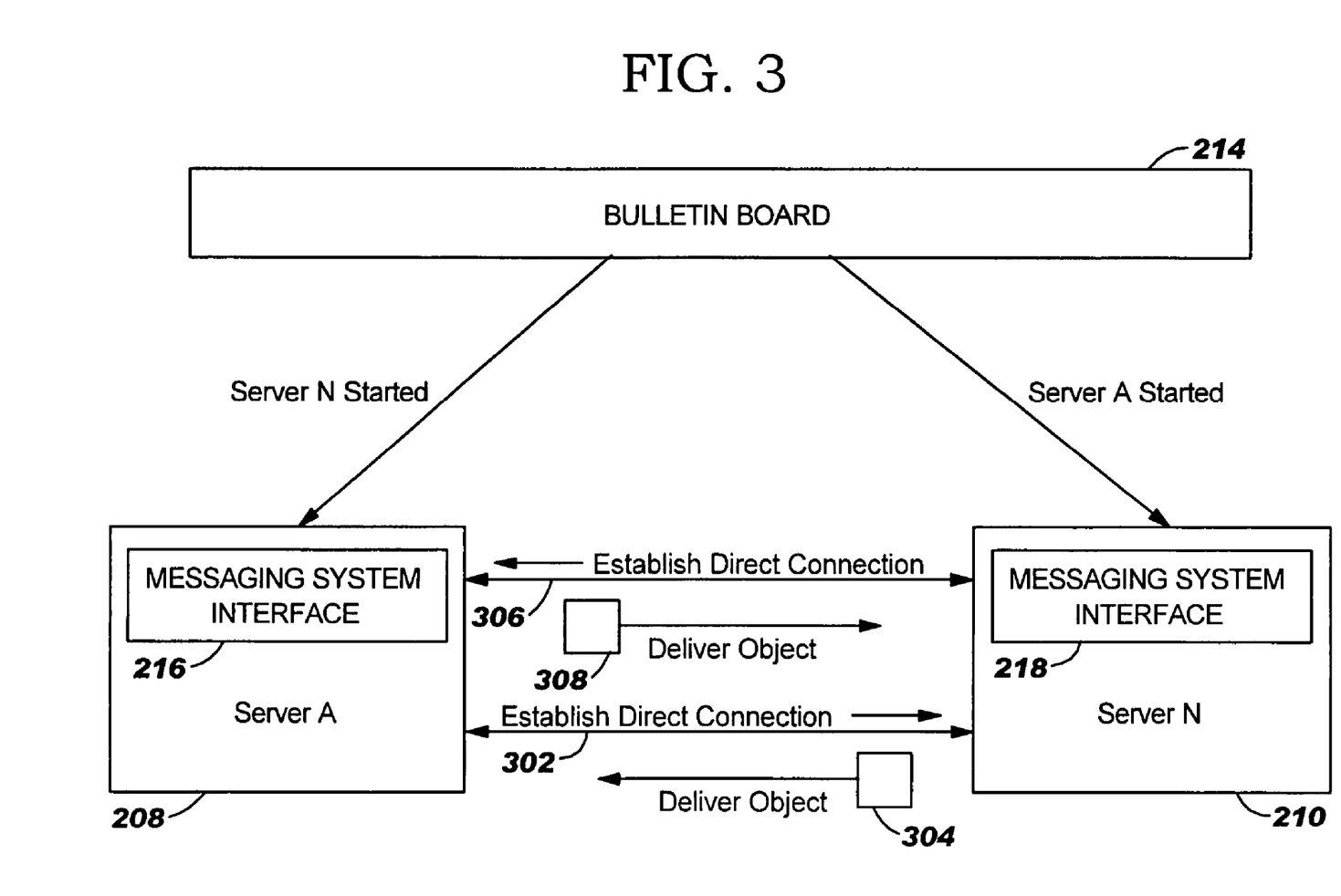
FIGS. 3 and 4 are block diagrams respectively showing selected components of the node configuration of FIG. 2 to illustrate direct communication between two servers, in accordance with an embodiment of the invention.

Referring to FIG. 3, there is shown server 208, referred to hereinafter as server A, receiving notification that server 210, hereinafter referred to as server N, has started. Upon receiving this notification server A queries or checks with each of its services, to determine whether any of them is interested in tracking any events in the newly started server N. This procedure may be carried out, for example, by a service or a component of server A such as a Query Server A Services Component 220, shown in FIG. 2. If one or more services of server A responds affirmatively to such query, and identifies one or more events of server N that server A should monitor or keep track of, server A creates a direct connection with the newly started server N. More specifically, server A operates to establish a direct communication path or link 302 with server N, as shown in FIG. 3. Usefully, the connection task is carried out by a service of server A, such as Server Linking Component 222 shown in FIG. 2.

Figure 4:
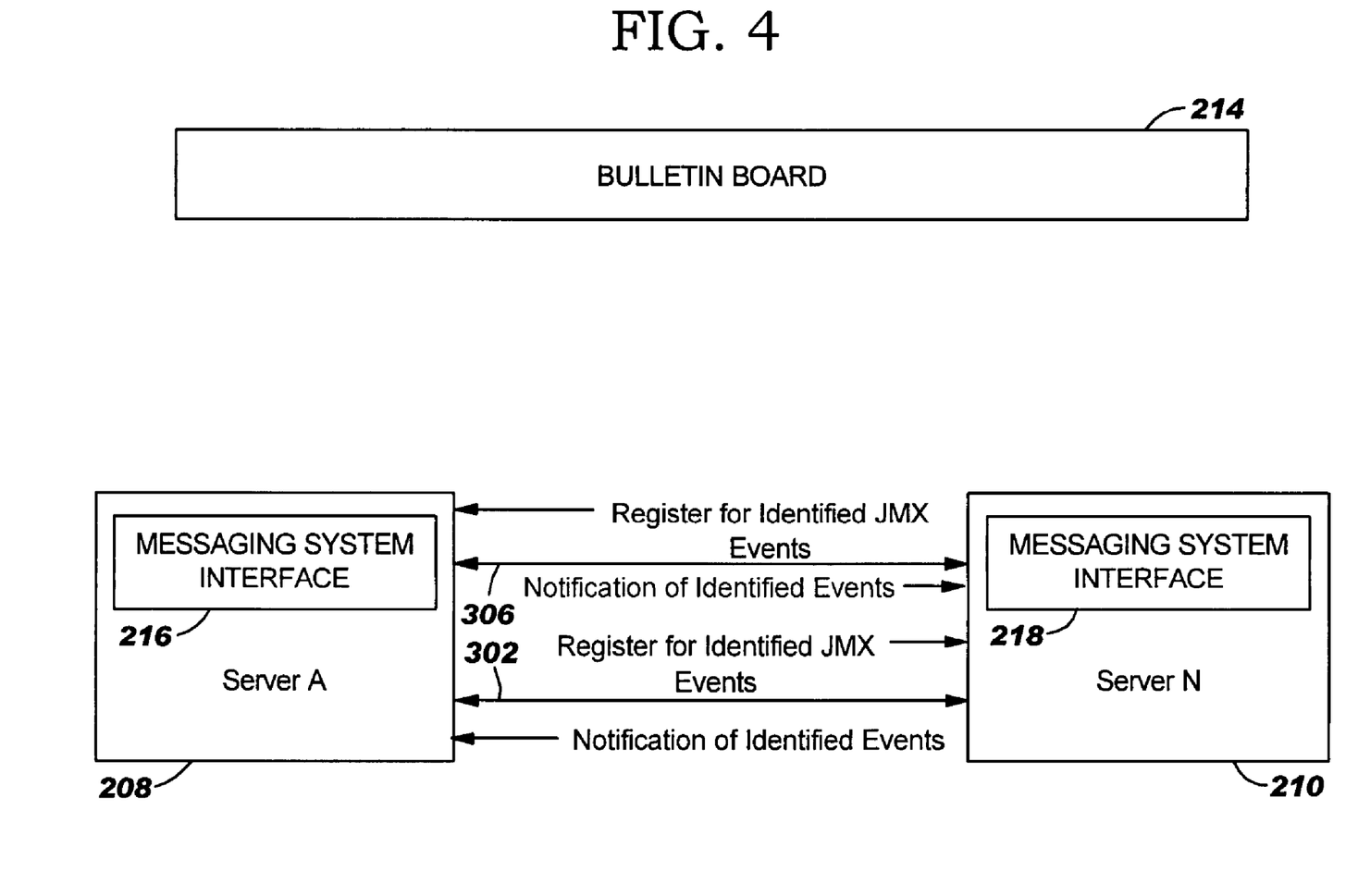

Referring further to FIG. 3, after communication path 302 is set up to establish a direct connection between server A and server N, server A retrieves an object 304 from server N. Server A then uses the object to register with server N to receive notifications of the events identified during the querying procedure, referred to above. Thus, services of server A that are interested in or affected by respective identified events are notified when such events occur in server N. FIG. 4 shows the identified events including JMX events. The registration procedure is usefully implemented by a service of server A, such as Server Registration Component 224 shown in FIG. 2. Notification of the identified server N events is furnished directly from server N to server A, by means of communication path 302. Thus, the embodiment of the invention shown in FIGS. 2-4 overcomes the prior art problem of a node agent acting as a single point of failure at a node, blocking the flow of server state information.

FIG. 2 further shows other services 226 of server A, collectively representing respective services of server A that may seek to monitor events of servers N, or servers of other nodes. FIG. 2 also shows server N provided with services or components 228-234 that respectively correspond to services 220-226 of server A. Thus, when server N is notified by bulletin board 214 that server A has started, as shown in FIG. 3, services 228-232 carry out functions for server N similar to those described above for services 220-224, respectively. Accordingly, a direct connection is established between server N and server A, by means of a communication path 306. An object 308 is delivered from server A to server N, for use by server N to monitor identified JMX events of server A that are of interest to services of server N. FIG. 4 shows server N registering for these identified events with server A, and further shows notification of respective events being provided directly from server A to server N, by means of direct communication path 306.

Figure 5:
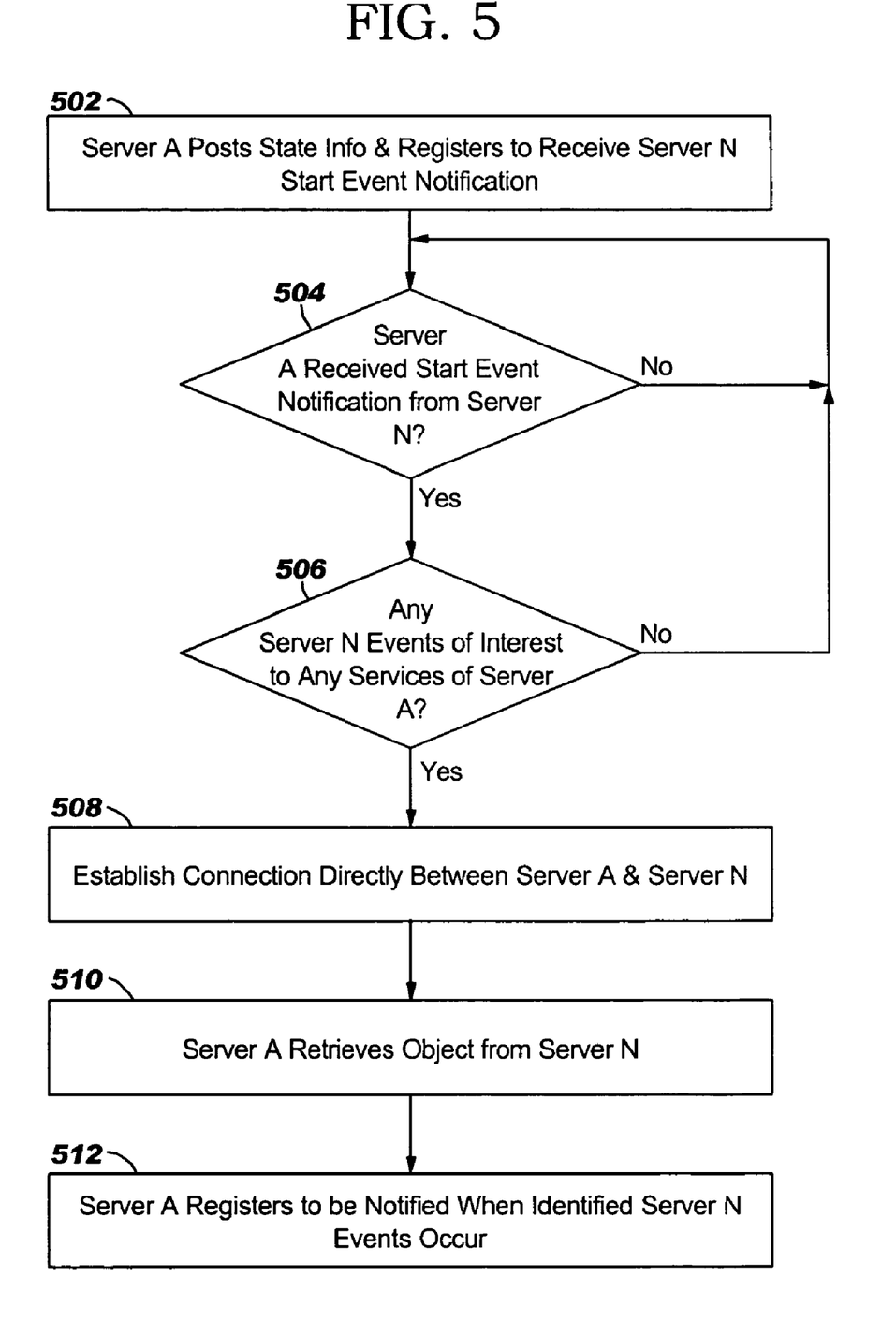
FIG. 5 is a flow chart further illustrating the embodiment of FIGS. 3-4.

Referring to FIG. 5, there is shown interaction of server A with bulletin board 214, and also with server N, as described above. Function block 502 of FIG. 5 shows server A posting its state information with bulletin board 214, and also registering with bulletin board 214 to receive start event notifications from bulletin board 214, for selected servers of other nodes.

FIG. 5 further shows decision blocks 504 and 506. These decision blocks collectively indicate that when server A receives a start event notification for server N, respective services of server A are queried, to determine whether there is any interest in any server N events. If there is, a direct connection is established between server A and server N, as indicated by function block 508, and an object from server N is retrieved by server A, as indicated by function block 510. As shown by function block 512, the object is used to register server A to be notified by server N, whenever one of the events of interest occurs.

Figure 6:
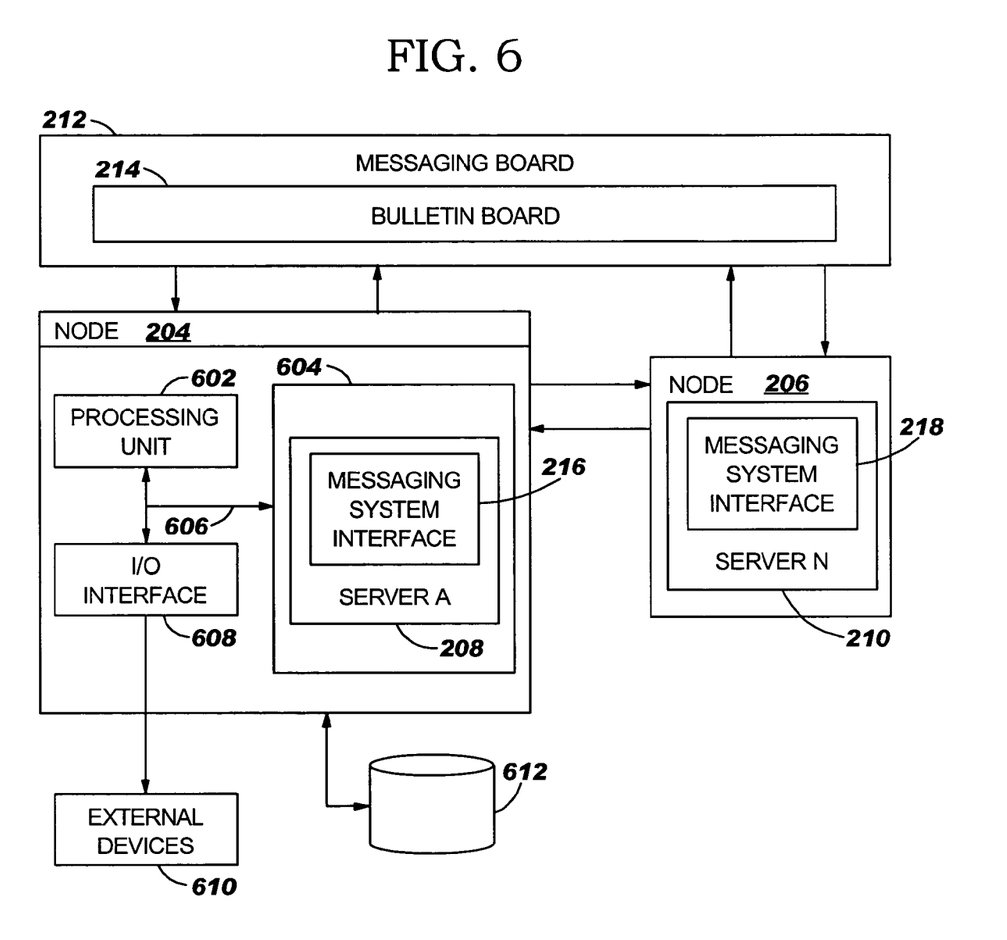
FIG. 6 is a simplified block diagram showing a computer arrangement for implementing the embodiment of FIGS. 3-4.

Referring to FIG. 6, a more specific computerized implementation of the present invention is shown in regard to node 204. It should be understood that node 206 and other nodes of configuration 202 will include similar components. FIG. 6 shows node 204 including a processing unit 602, a memory 604, a bus 606, input/output (I/O) interfaces 608, external devices/sources 610 and a storage unit 612. Processing unit 602 may comprise a single processing unit, or may be distributed across one or more processing units in one or more locations. Memory 604 may comprise any known type of data storage media, such as magnetic media, optical media, random access memory (RAM), read-only memory (ROM), a data cache or a data object. Moreover, memory 604 may reside at a single physical location, or be distributed across a plurality of physical systems in various forms.

I/O interfaces 608 may comprise any system for exchanging information with an external device or source. External devices/sources 610 may comprise any known type of external device, such as speakers, a CRT, LED screen, hand-held device, keyboard, mouse, voice recognition system, speech output system, printer, monitor or display. Bus 606 provides a communication link between each of the components in node 204 and may comprise any known type of transmission link, such as an electrical, optical or wireless link.

Storage unit 612 can be any system (e.g. a database) capable of providing storage for information (e.g., server state information) under the present invention. Accordingly, storage unit 612 could include one or more storage devices, such as a magnetic disk drive or an optical disk drive. In another embodiment, storage unit 612 could include data distributed across, for example a LAN, a WAN or a storage area network SAN (not shown). Although not shown, additional components, such as cache memory, communication systems, or system software may be incorporated into node 204. As indicated above, node 206 will have components similar to those shown for node 204.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product stored in a computer readable recordable-medium for monitoring events occurring at respective servers in a configuration of nodes wherein at least one server is located at each node, the computer program product comprising:

first instructions for arranging for a first server located at a first node to receive information from a messaging system that pertains to events at servers located at other nodes, further comprising:

instructions for furnishing said messaging system with a current state of said first server; and instructions for registering said first server to receive start event notifications pertaining to selected other servers from said messaging system, wherein each of said servers contains a messaging system interface component for registering and continually updating a state of its server with said messaging system, and for subscribing to said messaging system to receive said start event notifications pertaining to said selected other of said servers;

second instructions for establishing a direct communication path between said first server and a second server located at a second node, when said first server receives a start event notification pertaining to said second server from said messaging system, wherein said first server has one or more associated services, and wherein:

upon receiving said start event notification pertaining to said second server, said first server queries each of its services to identify which events of said second server, if any, affect one or more of said services of said first server, wherein an object is sent from said second server to said first server through said direct communication path, for use by said first server in registering to receive notification of said identified events of said second server, wherein said messaging system includes a highly available bulletin board, wherein said identified events of said second server are selected from a group that includes server states wherein said second server is starting, has started, is stopping, and has stopped, and wherein said identified events of said second server further include JMX events; and said first server is registered to receive said notification of said identified events from said second server, through said direct communication path, when any of said identified events occurs; and third instructions for sending messages directly from said second server to said first server through said direct communication path to notify said first server when specified said identified events occur at said second server.

2. In a configuration of nodes wherein at least one server is located at each node, a computer system comprising:

a processor; and a computer readable medium connected to said processor, said medium configured to be read by said processor and to thereby cause said processor to:

arrange for a first server located at a first node to receive information from a messaging system that pertains to events at servers located at other nodes, further comprising:

furnishing said messaging system with a current state of said first server; and registering said first server to receive start event notifications pertaining to selected other servers from said messaging system, wherein each of said servers contains a messaging system interface component for registering and continually updating a state of its server with said messaging system, and for subscribing to said messaging system to receive said start event notifications pertaining to said selected other of said servers;

establish a direct communication path between said first server and a second server located at a second node, when said first server receives a start event notification pertaining to said second server from said messaging system, wherein said first server has one or more associated services, and wherein:

upon receiving said start event notification pertaining to said second server, said first server queries each of its services to identify which events of said second server, if any, affect one or more of said services of said first server, wherein an object is sent from aid second server to said first server through said direct communication path, for use by said first server in registering to receive notification of said identified events of said second server, wherein said messaging system includes a highly available bulletin board, wherein said identified events of said second server are selected from a group that includes server states wherein said second server is starting, has started, is stopping, and has stopped, and wherein said identified events of said second server further include JMX events; and said first server is registered to receive said notification of said identified events from said second server, through said direct communication path, when any of said identified events occurs: and send messages directly from said second server to said first server through said direct communication path to notify said first server when specified said identified events occur at said second server.

* * * * *